United States Patent
Xiao

(10) Patent No.: US 11,926,053 B2
(45) Date of Patent: Mar. 12, 2024

(54) ROBOTIC SIMULATION DISTRIBUTED VERSION CONTROL SYSTEM

(71) Applicant: Hitachi, Ltd., Tokyo (JP)

(72) Inventor: Yuan Xiao, Northville, MI (US)

(73) Assignee: HITACHI, LTD., Tokyo (JP)

(*) Notice: Subject to any disclaimer, the term of this patent is extended or adjusted under 35 U.S.C. 154(b) by 302 days.

(21) Appl. No.: 17/489,662

(22) Filed: Sep. 29, 2021

(65) Prior Publication Data

US 2023/0103209 A1    Mar. 30, 2023

(51) Int. Cl.
| | | |
|---|---|---|
| B25J 9/16 | (2006.01) | |
| B25J 13/00 | (2006.01) | |
| G06F 8/71 | (2018.01) | |

(52) U.S. Cl.
CPC ............ B25J 9/163 (2013.01); B25J 9/1643 (2013.01); B25J 9/1671 (2013.01); B25J 13/006 (2013.01); G06F 8/71 (2013.01)

(58) Field of Classification Search
CPC .. G06F 8/71; B25J 9/163; B25J 9/1643; B25J 9/1671; B25J 13/006
See application file for complete search history.

(56) References Cited

U.S. PATENT DOCUMENTS

| | | | | |
|---|---|---|---|---|
| 7,739,655 | B1* | 6/2010 | Monteiro | G06F 8/10 717/109 |
| 8,887,126 | B1* | 11/2014 | Monteiro | G06F 8/71 717/109 |
| 9,671,777 | B1* | 6/2017 | Aichele | B25J 9/1666 |
| 10,317,868 | B2* | 6/2019 | Schroeter | G05B 19/41885 |
| 10,678,666 | B1* | 6/2020 | Gauf | G06F 11/2635 |
| 2003/0090491 | A1* | 5/2003 | Watanabe | B25J 9/1671 345/473 |
| 2012/0096455 | A1* | 4/2012 | Katsumata | G06F 9/45558 717/177 |
| 2013/0332916 | A1* | 12/2013 | Chinn | G06F 8/65 717/169 |
| 2014/0214394 | A1* | 7/2014 | Inoue | G06F 30/20 703/13 |
| 2017/0078511 | A1* | 3/2017 | Hasegawa | G06F 3/1285 |
| 2019/0079855 | A1* | 3/2019 | Dewitt | G06F 11/3692 |
| 2020/0159648 | A1* | 5/2020 | Ghare | G06F 9/4411 |
| 2020/0167687 | A1* | 5/2020 | Genc | G06F 30/20 |
| 2021/0374032 | A1* | 12/2021 | Rakshit | G06F 11/3093 |
| 2022/0075351 | A1* | 3/2022 | Miller | G06F 11/1458 |

* cited by examiner

*Primary Examiner* — Douglas M Slachta
(74) *Attorney, Agent, or Firm* — Procopio, Cory, Hargreaves & Savitch LLP

(57) ABSTRACT

Example implementations described herein can involve a plurality of data repositories involving a data repository configured to manage data versions of data sets corresponding to robot simulation versions; a code repository configured to manage code versions of executable code corresponding to the robot simulation versions; and a robot model repository configured to manage model versions of robot models corresponding to the robot simulation version. Responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code, and a corresponding robot model.

6 Claims, 9 Drawing Sheets

ROBOTIC SIMULATION DISTRIBUTED VERSION CONTROL SYSTEM

BACKGROUND

Field

The present disclosure is directed to robotic simulation systems, and more specifically to distributed version control systems for robotic simulation.

Related Art

Robot simulation is an essential tool during the development of robotic applications. A well-designed simulator makes it possible to rapidly test algorithms, design robots, perform regression testing, and train artificial intelligence (AI) system using realistic scenarios. FIG. 1 illustrates the related art way of developing robotic applications with the assistance of robotic simulator and robot operating system.

Typically, each developer will only focus on their field of interest. For example, the first developer develops the end-to-end pick and place workflow for a robot arm, the second developer develops the robot vision application, and the third developer develops the motion planning algorithm for a space robot. Although each application is different, the basic environment setup is the same and sometimes they share same types of real-world sensor data.

Consider the following scenario: (1) The first developer wants to reuse part of the configuration setup of the second developer in his own environment; (2) All developers are developing sub systems which are part of one complicated robotic system and need other developer to validate the whole system; (3) One developer want to use another developers' robot physics model parameters; (4) Simulation data involves several versions and should be shared across all developers. The related art workflow cannot address such scenarios and causes an extensive manual workload burden for each developer. Different robot physics models, data, hyper-parameters, parameters, and algorithms have been tested during the process. However, there is no suitable solution to manage those combinations/changes outside of addressing it manually.

Additionally, the robot simulation makes robotic automation a viable option for nearly any manufacturer. It is used during the quoting and concept stage to provide proof of design, proof of process and to maximize a robot user's automation investment.

Consider a simple robot simulation example to simulate a robot arm grasp and move an object. This task can be broken down into to following steps: (1) Determine the position of the object relative to the robot, which requires a vision sensor, typically a 3D camera, and vision algorithms to find the position of the object with high enough precision. In such an example, the robot vision sensor model is included in the robot simulator. (2) Move the robot gripper towards the object, without colliding with the environment; (3) Grasp the object; (4) Move the grasped object towards the desired position, without colliding with the environment. (5) Release the object. To generate the commands that move the robot gripper to and from an appropriate position to grasp the object, without colliding with the environment, a manipulator kinematics model included in the robot simulator and associated motion planning to interact and control with the physics is required.

FIG. 2 illustrates the related art pipeline to make a robot move with robot simulation. Usually, the developer will plan the trajectory and convert the trajectory to a ROS trajectory. The next step will be sending the ROS trajectory to the robot controller. The robot controller moves the robot joints to the desired joint values at the desired time instants, as specified by the trajectory, using its own control algorithms, which are usually not accessible to the end user.

SUMMARY

Robotic systems are not one-size-fits-all. Robot simulations help to fine tune and customize robotic designs to ensure the system will fit seamlessly with existing production processes and equipment. However, the standalone robot simulation development pattern is not automated enough to address data sharing, versioning during the process of development. Therefore, example implementations described herein are directed to systems and methods that automate and manage the simulation work vertically and scale the robot simulation across multiple teams horizontally.

The example implementations described herein are utilized to all those environment re-use, data re-use needs that happen frequently in the robotic product development cycle.

The example implementations described herein introduce a platform that can manage the different versions of software/data combinations during the robotic application development process with robotic simulations. Robotic simulation is an iterative process, involving robot physics models, sensors description, world geometry and control/planning algorithm, and so on. The proposed distributed version control system will serve as a solution to tackle all above areas to ease the complicated robotic system development process.

In the robotic product development process, testing different run-time scenarios with actual robot is expensive both in time and cost. Robotic simulations with either off-the-shelf or open-source software tools are a great way to reduce time, cost, and errors for robotic systems. Simulations are performed on a device such as a personal computer (PC) with exact robot parameters built in as well as other cell components, so testing emulates the real world. Different robot physics models, data, hyper-parameters, parameters, and algorithms have been tested during the process. However, there is no suitable solution to manage those combinations/changes instead of manual work.

Aspects of the present disclosure can involve a system, which can involve a plurality of data repositories, the plurality of data repositories including a data repository configured to manage data versions of data sets corresponding to robot simulation versions; a code repository configured to manage code versions of executable code corresponding to the robot simulation versions; and a robot model repository configured to manage model versions of robot models corresponding to the robot simulation versions; and a management server, involving a processor, configured to, responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation.

Aspects of the present disclosure can involve a management server communicatively coupled to a plurality of data repositories, the plurality of data repositories comprising a data repository configured to manage data versions of data sets corresponding to robot simulation versions; a code repository configured to manage code versions of executable code corresponding to the robot simulation versions; and a robot model repository configured to manage model versions of robot models corresponding to the robot simulation versions; the management server involving a processor, configured to, responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation.

Aspects of the present disclosure can involve a system, which can involve a plurality of data repositories, the plurality of data repositories including a data repository configured to manage data versions of data sets corresponding to robot simulation versions; a code repository configured to manage code versions of executable code corresponding to the robot simulation versions; and a robot model repository configured to manage model versions of robot models corresponding to the robot simulation versions; and means for, responsive to a request of execution of a robot simulation, fetching, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation.

DETAILED DESCRIPTION

Figure 1:
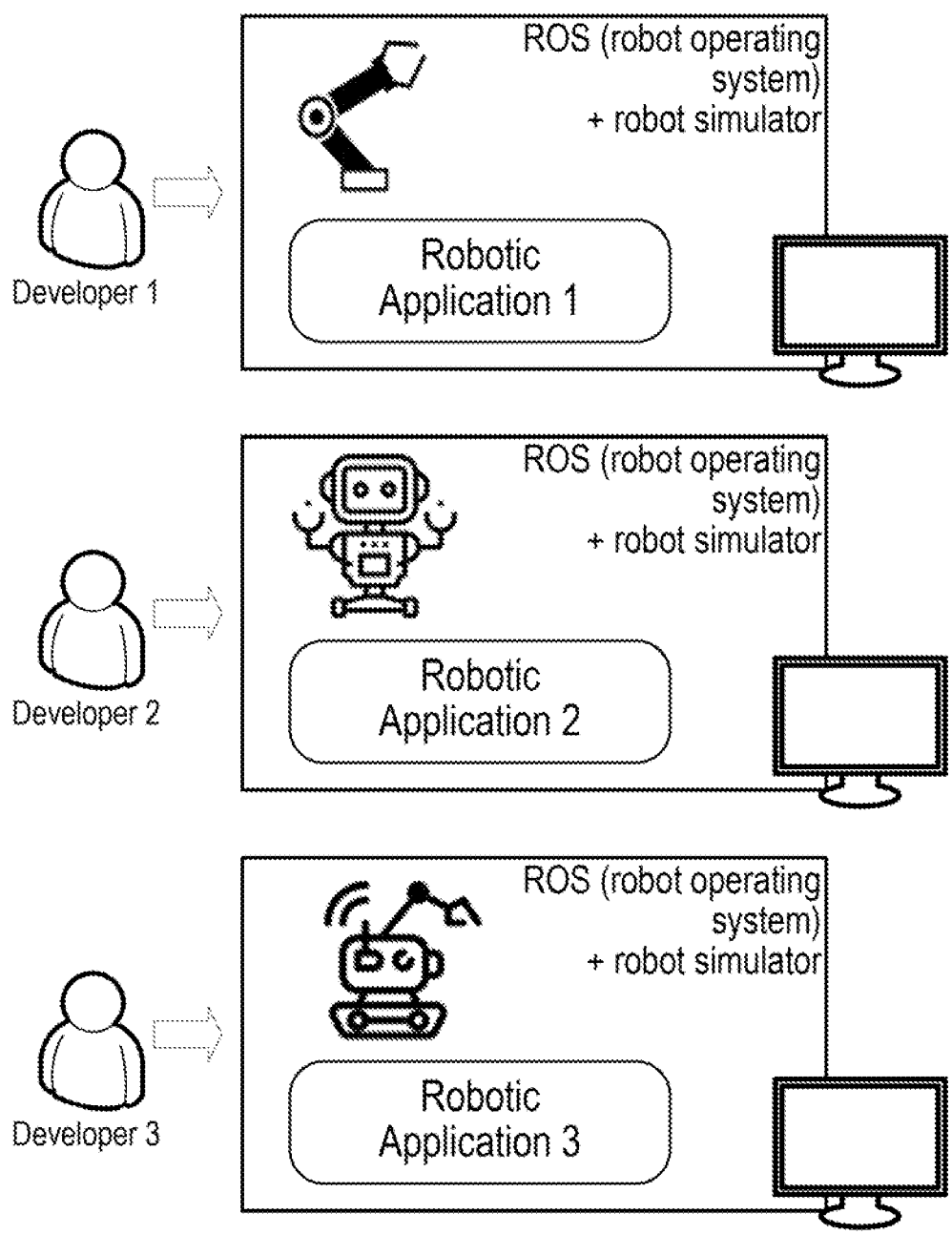
FIG. 1 illustrates the related art way of developing robotic applications with the assistance of robotic simulator and robot operating system.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 3:
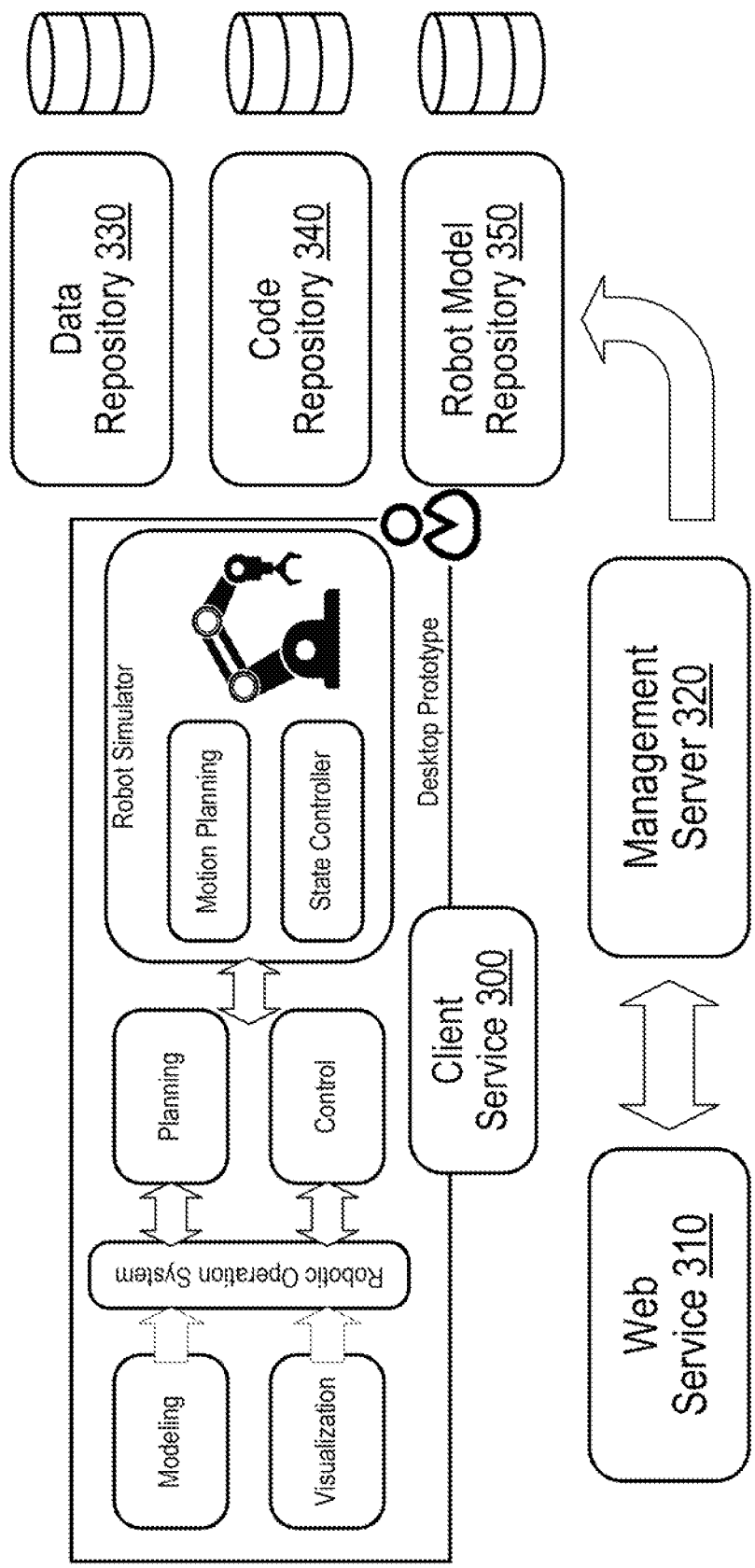
FIG. 3 illustrates an example of a high-level architecture in accordance with an example implementation.

FIG. 3 illustrates an example of a high-level architecture in accordance with an example implementation. Specifically, FIG. 3 illustrates the client service 300 that resides on user development machines for commit and pull the environment setup and data, the web service 310 that serves the web portal and allows users and administrators to view the committed data and model, the management server 320 and correspondent repository that manage the versioning and so on. In the example of FIG. 3, there are a plurality of data repositories, which include a data repository 330 configured to manage data versions of data sets corresponding to robot simulation versions; a code repository 340 configured to manage code versions of executable code corresponding to the robot simulation versions; and a robot model repository 350 configured to manage model versions of robot models corresponding to the robot simulation versions. As will be described herein, responsive to a request of execution of a robot simulation, management server 320 will fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation.

To use the platform, the user needs to interact with client service 300. For example, one developer wants to copy the whole environment setup as another developer, including the mode parameter version and data version. Then the client service 300 will request the management server to take the indicated type of snapshot and respond to the client service 300. The client service 300 is then responsible for the installation of the package, setup of the data link, and so on. The client application that is installed on the user machine will monitor the workspace folder that was setup by the user in the configuration, and synchronizes all files/folders in it with the remote cloud storage once the user sets the command to push the current version into the remote repository. The client service will work with the storage servers to upload, download, and modify the actual files for the back-end cloud storage. The client also interacts with the remote synchronization service to handle any updates or versions from other users.

In example implementations described herein, there can be various data repositories, a data repository 330 configured to manage data versions of data sets corresponding to robot simulation versions of the robot simulator in the client service 300; a code repository 340 configured to manage code versions of executable code corresponding to the robot simulation versions; and a robot model repository 350 configured to manage model versions of robot models corresponding to the robot simulation versions.

Figure 4:
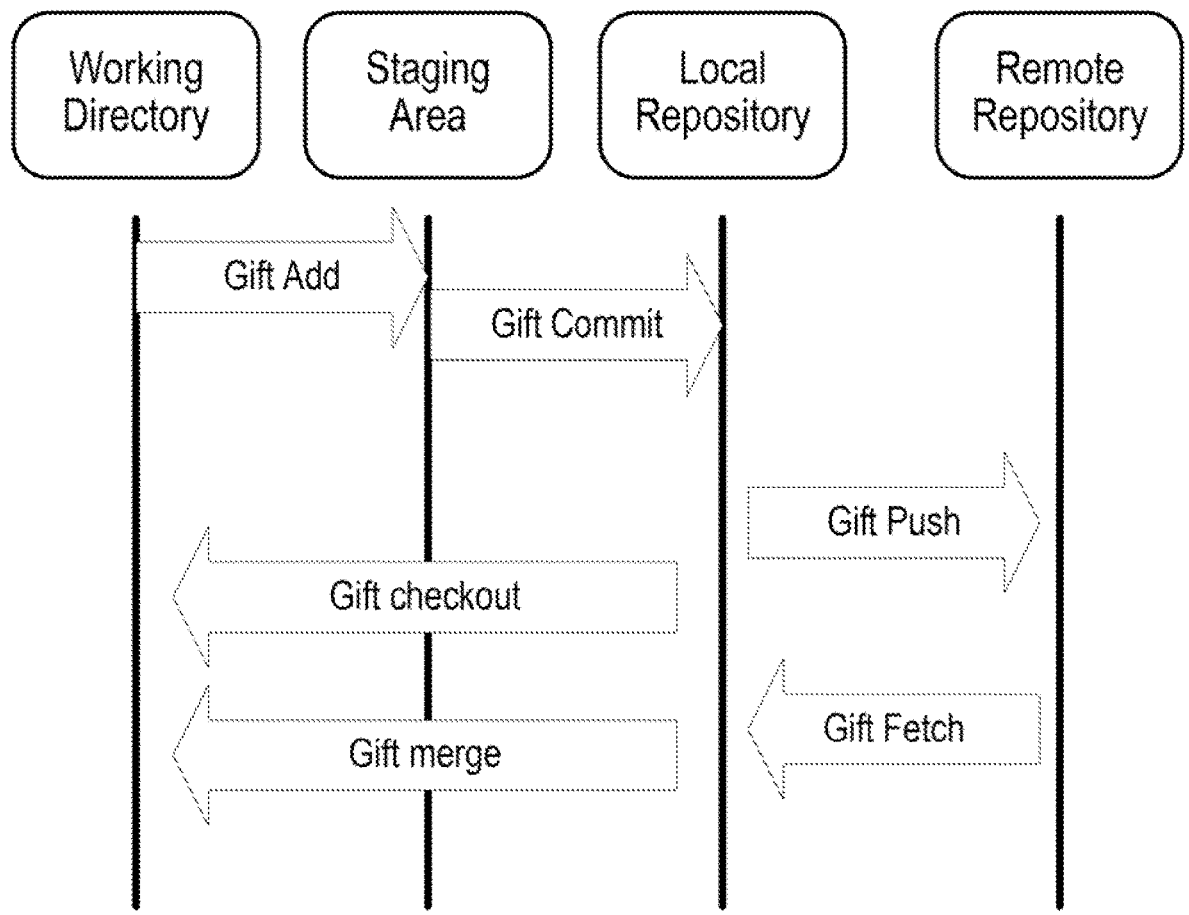
FIG. 4 illustrates client operations, in accordance with an example implementation.

FIG. 4 illustrates client operations, in accordance with an example implementation. In summary, the operations for the client can involve add, commit and push local environment and models into remote distributed cloud storage; fetch, checkout, merge of remote files into current working directory; detect file changes in the workspace folder; and handle conflict due to offline or concurrent updates.

Each file is broken into smaller chunks so that only those chunks that are modified are transferred and not the whole file. Example implementations can statically calculate the optimal chunk size based on 1) storage devices used in the cloud to optimize space utilization and input/output operation per seconds; 2) Network bandwidth 3) Average file size in the storage, and so on, depending on the desired implementation.

Figure 5:
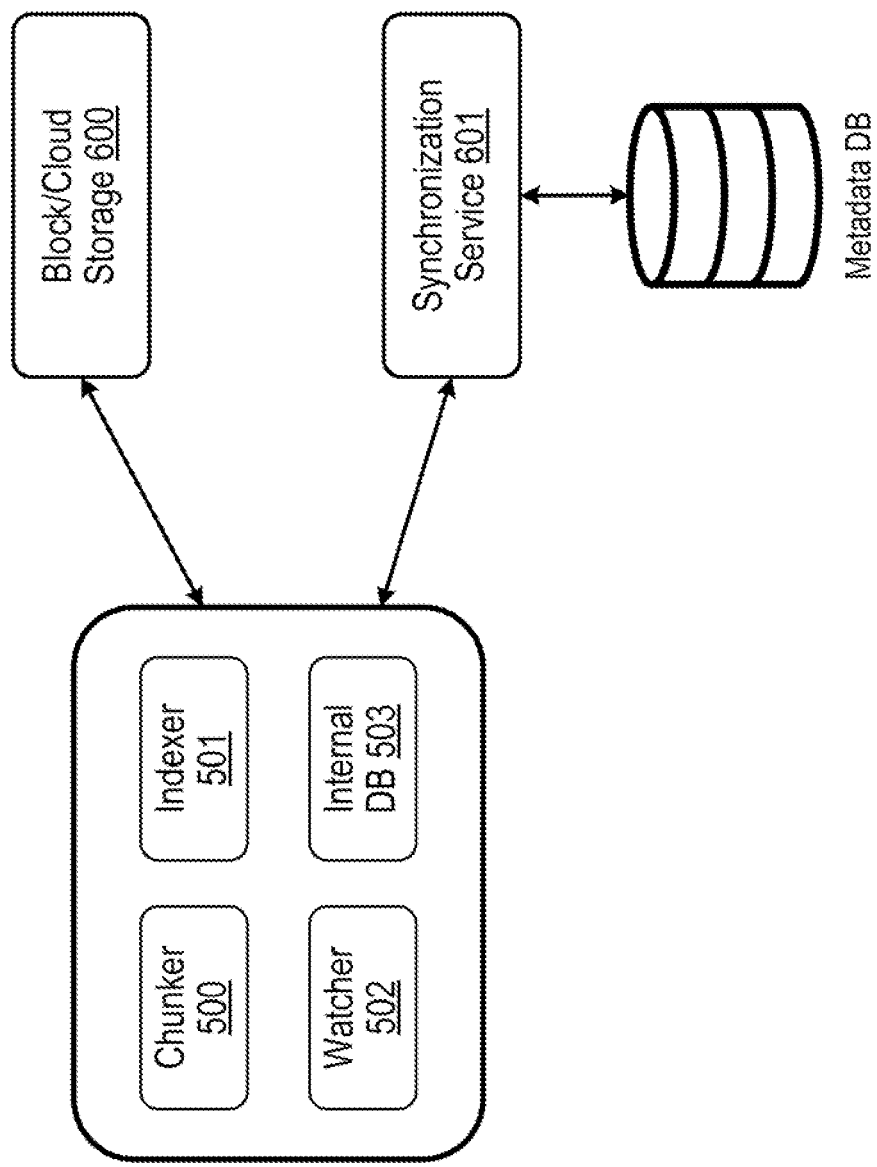
FIG. 5 illustrates an example of the client service architecture, in accordance with an example implementation.

FIG. 5 illustrates an example of the client service architecture, in accordance with an example implementation. There are four major components of the client services as shown in FIG. 5.

Chunker 500 splits the files into smaller pieces called chunks. It will also be responsible for reconstructing a file from its chunks. The chunking algorithm will detect the parts of the files (Robot model, data) that has been modified by the user in their local file system and transfer those parts with a new version identifier (ID) when the user issues the command to the current version of the snapshot.

Indexer 501 processes the events received from the watcher and updates the internal metadata database with the information of the new versioning ID and which chunks has been modified. Once the chunks are successfully submitted/download to the block/cloud storage 600, the indexer 501 will communicate with the remote synchronization service to broadcast changes to other clients and update the remote metadata database.

The watcher 502 monitors the local workspace folders and notifies the indexer 501 as described herein for any action performed by the users, e.g., when users commit, push, fetch or update files or folders. The watcher 502 also listens to any changes happening on other clients that are broadcasted by synchronization service 601.

Internal Metadata Database 503 tracks all the files, chunks, their versions, and their locations in the file system.

In the architectures described herein, the block/cloud storage 600 can involve a block storage system, a file storage system, and a cloud storage system. In such an example architecture, the block storage system is configured to store robot simulations corresponding to the robot simulation versions in redundant blocks, the file storage system stores files associated with a metadata database configured to manage metadata for the robot simulation versions, the data versions, the code versions, and the model versions, and the cloud storage system is configured to facilitate storage for the block storage system, the file storage system, and the plurality of data repositories.

Figure 6:
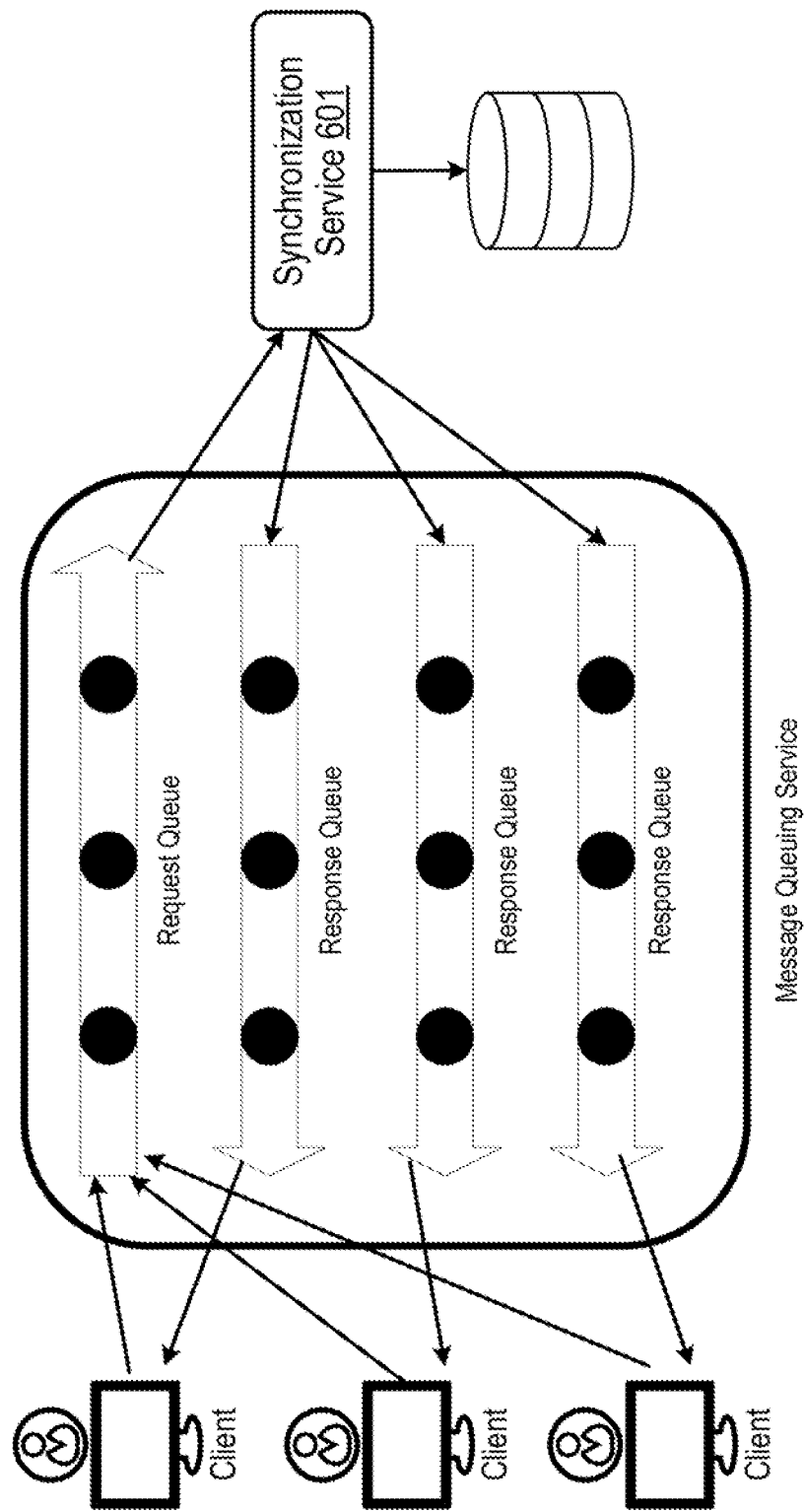
FIG. 6 illustrates a message queuing service, in accordance with an example implementation.

FIG. 6 illustrates a message queuing service, in accordance with an example implementation. The web service in example implementations described herein is used in a way for the project owner and developer to manage the versioning data and model through a web page. The web service involves the following aspects.

For the front-end web service, a Hypertext Transmission Protocol (HTTP) web server as is known in the art is used for managing the requests from the clients and rendering the user interface.

For the message queuing service, the metadata database is responsible for maintaining the versioning and metadata information regarding files/chunks, users, and workspaces. The metadata database can be a relational database such as MySQL, or a NoSQL database service as is known in the art. Regardless of the type of the database, the synchronization service 601 can provide a consistent view of the files using a database, especially if more than one user is working with the same file simultaneously. Since NoSQL data stores do not support ACID properties in favor of scalability and performance, there is a need to incorporate the support for ACID properties programmatically in the logic of the synchronization service in case such a database is to be used. However, using a relational database can simplify the implementation of the synchronization service as they natively support ACID properties.

For the load balancing service, the load balancing layer can be used at two places in the system: 1) Between Clients and Block servers and 2) Between Clients and Metadata servers. Initially, a round robin approach can be adopted that distributes incoming requests equally among backend servers. This type of load balancing is simple to implement and does not introduce any overhead. Another benefit of this approach is if a server is offline, the load balancing will take the server out of the rotation and will stop sending any traffic to the server. A problem with the round robin load balancing is that it will not take server load into consideration. If a server is overloaded or slow, the load balancing will not stop sending new requests to that server. To handle this, a more intelligent load balancing solution can be placed that periodically queries backend server about their load and adjusts traffic based on that.

Figure 7:
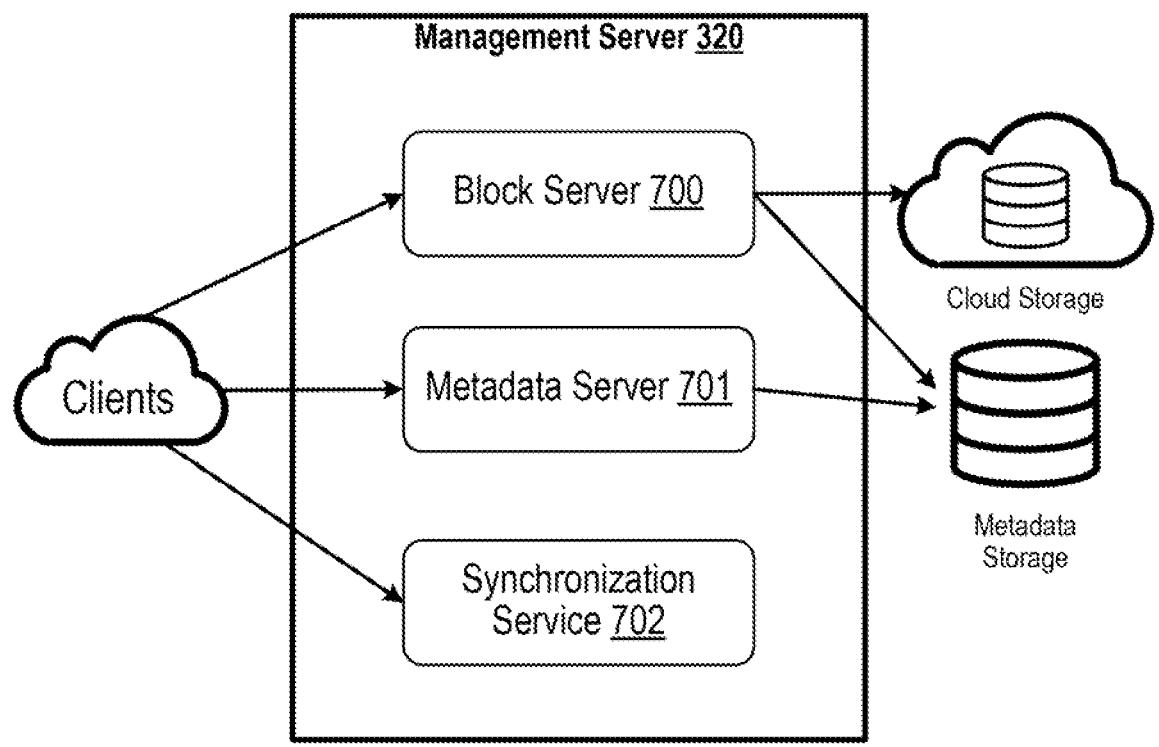
FIG. 7 illustrates an example client service architecture, in accordance with an example implementation.

FIG. 7 illustrates an example client service architecture, in accordance with an example implementation. The management server 320 contains three components as follows.

The block server 700 is used to work with the client to upload/download the robot model and configuration file from cloud storage. The metadata server 701 is to manage all program related metadata of the solution. It will keep the metadata of files updated in a non-relational database, as well as the versioning information.

The synchronization service 702 stays in the backend management server that processes the commit command made by users and applies the changes to this specific commit into cloud storage and broadcasts to other subscribed clients. It also synchronizes the client local databases with the information stored in the remote metadata database. In example implementations described herein, the synchronization service 702 is configured to, responsive to a commit command to commit a new robot simulation version associated with a corresponding one of the code versions, model versions and data versions, commit the new robot simulation to cloud storage and broadcast the new robot simulation version to one or more client devices via a differencing algorithm between the new robot simulation version and a prior robot simulation version as follows.

To achieve a better response time, the synchronization service 702 transmits less data between clients and the cloud storage through the management server 320. To facilitate such an implementation, the synchronization service 702 employs a differencing algorithm to reduce the amount of data that needs to be synchronized. Instead of transmitting entire files from clients to servers or vice versa, example implementations transmit the difference between the two versions. Therefore, a data structure is used that keeps the parent version ID. This also decreases bandwidth consumption and cloud data storage for the end user. To provide an efficient and scalable synchronization protocol, the solution has chosen to use a communication middleware between the clients and synchronization service 702. The messaging middleware will provide scalable message queuing and change notifications to support a high number of clients using pull or push strategies. Multiple synchronization service instances can receive requests from a global request queue, and the communication middleware will be able to balance its load.

Figure 8:
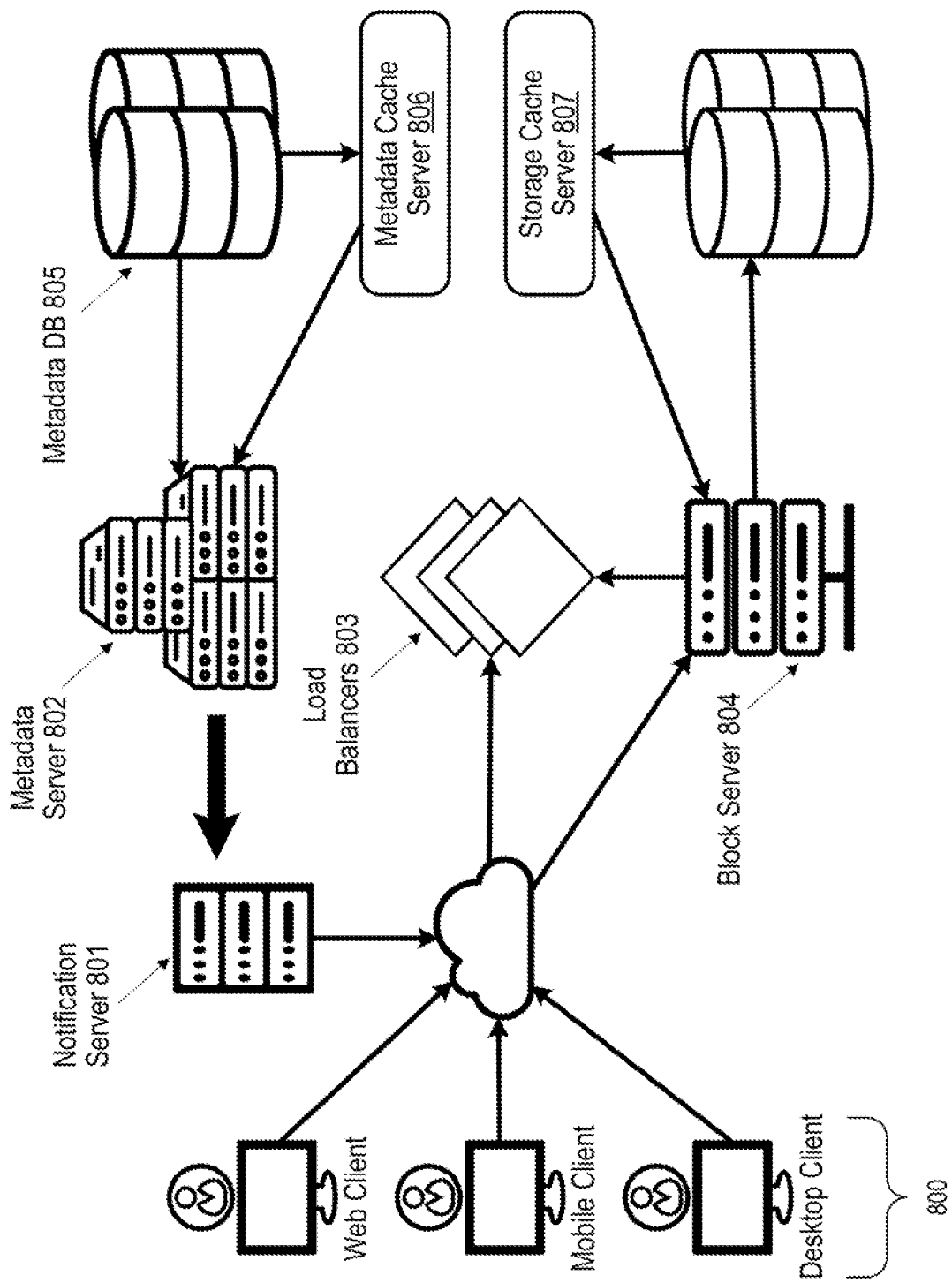
FIG. 8 illustrates a detailed architecture of the solution, in accordance with an example implementation.

FIG. 8 illustrates a detailed architecture of the solution, in accordance with an example implementation. With respect to the storage server, there are mainly two types of contents that are stored. In the example architecture of the solution in FIG. 8, there are various clients 800 that engage with a network to communicate with the notification server 801, load balancers 803, and a block server 804. The notification server 801 can broadcast to the clients 800 information from the metadata server 802 as retrieved from the metadata database 805 and the metadata cache server 806. Load balancers 803 can balance communications to block server 804, the data of which can be managed by storage cache server 807.

A first type of content is file contents (data, code, robotic model), which involves the contents of the files that are stored in the working directory over the users. These are opaque bytes with mixed structure or format. Accordingly, robot models can thereby be stored as files in the file storage system.

When dealing with potentially very large uploads and data storages, it is often advantageous to split up data into blobs that can be pieces back together to form the original data. When uploading a file, the request will be load balanced across multiple servers that will be blob splittered, and such blob splitters will have the job of splitting files into blobs and storing such blobs in some global blob-storage solution.

Further, sufficient redundancy is required for the data being uploaded to prevent data loss. So, a strategy is adopted for redundancy such as pushing to three different buckets and considering a write to be successful only if it went through in at least two buckets. This way, there is always redundancy without necessarily sacrificing availability. In the background, there can be an extra service in charge of further replicating the data to other buckets in an asynchronous manner. For the three main buckets, buckets are selected in three different availability zones to avoid having all the redundant storage destroyed by catastrophic failures in the event of a natural disaster or huge power outage.

To avoid having multiple identical blobs stored in our blob stores, the blobs are named after a hash of their content. This technique is called content-addressable storage, and by using it, all blobs are essentially made immutable in storage. When a file changes, the entire new resulting blobs are uploaded under their new names computed by hashing their new contents. In this manner, redundant blocks and data sets can be stored as compressed data.

The second type of content is the entity information, such as the metadata for each entity. This can include fields like entityID, ownerID, lastModified, entityName, entityType, and so on in accordance with the desired implementation. This list is non-exhaustive.

The metadata database 805 is responsible for maintaining the versioning and metadata information about files/chunks, users, and workspaces. The metadata database 805 can be a relational database such as MySQL, or a NoSQL database. Regardless of the type of the database, the synchronization can be facilitated since it can simplify the implementation of the synchronization service as they natively support ACID properties.

Therefore, as shown in FIG. 8, there is a metadata cache server to manage metadata and a storage cache server to manage block storage.

The example implementations contain four major components, each component having a different usage: (1) Client services that allows version control of the robotic simulation packages as well as data versioning which allows users to switch back and forth. (2) Web visualization interfaces that are provided to project administration as well as developers for managing the data, models, and the project. (3) Backend service (management server) that are used to process the request from client service, interact with storage server, providing command paring service and even garbage collection service. (4) Distributed cloud storage for storing all data, models, and files.

With a robust system architecture as described herein, example implementations can be applied in the day-to-day development of various types of robot application. It provides a platform for developers to automate their day-to-day robot simulation job and enabling collaboration through configuration and data sharing.

Figure 9:
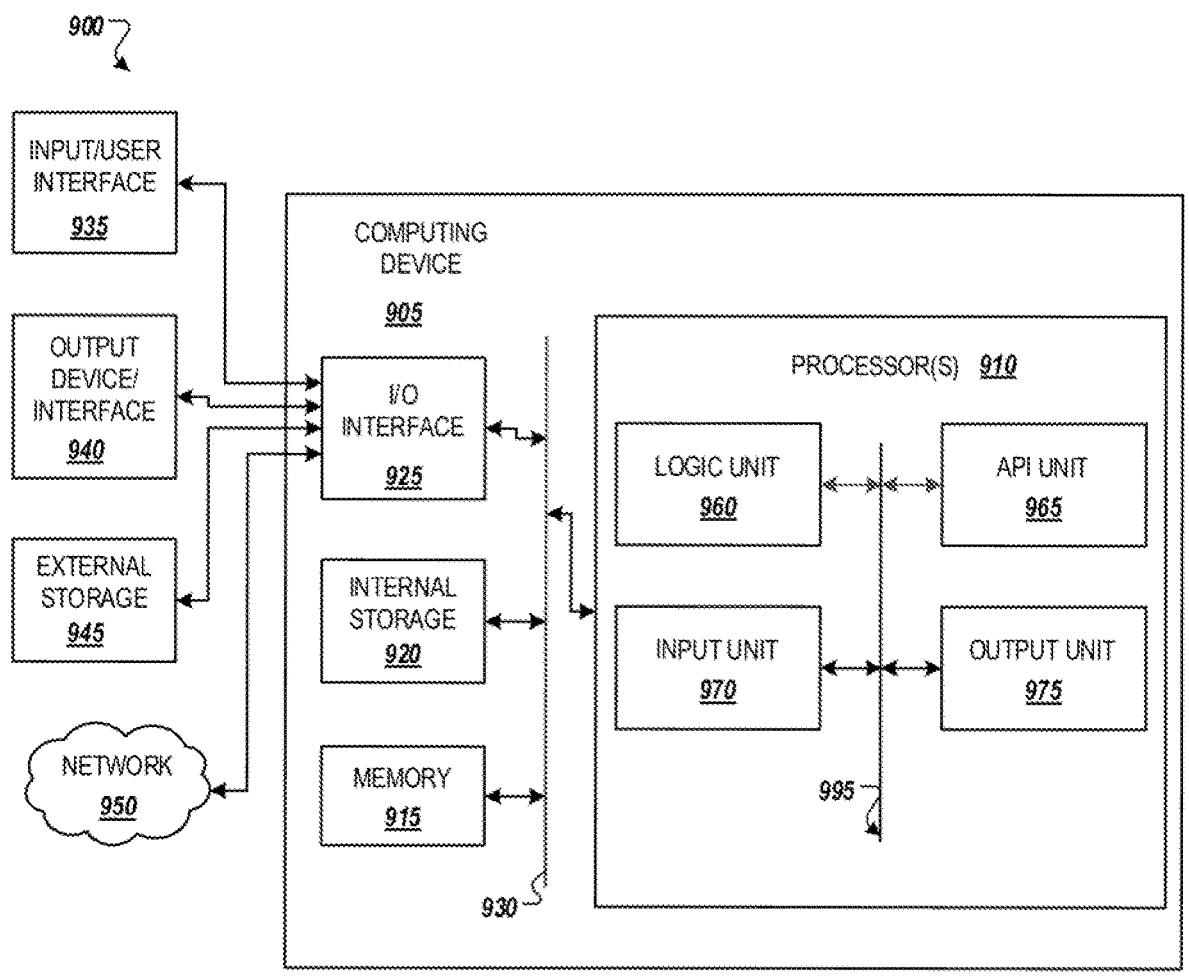
FIG. 9 illustrates an example computing environment with an example computer device suitable for use in some example implementations.

FIG. 9 illustrates an example computing environment with an example computer device suitable for use in some example implementations, such as a management server as described herein as communicatively coupled to, via a network, a plurality of data repositories, the plurality of data repositories involving a data repository configured to manage data versions of data sets corresponding to robot simulation versions; a code repository configured to manage code versions of executable code corresponding to the robot simulation versions; and a robot model repository configured to manage model versions of robot models corresponding to the robot simulation versions.

Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965.

The input unit 970 may be configured to obtain input for the calculations described in the example implementations, and the output unit 975 may be configured to provide output based on the calculations described in example implementations.

Figure 2:
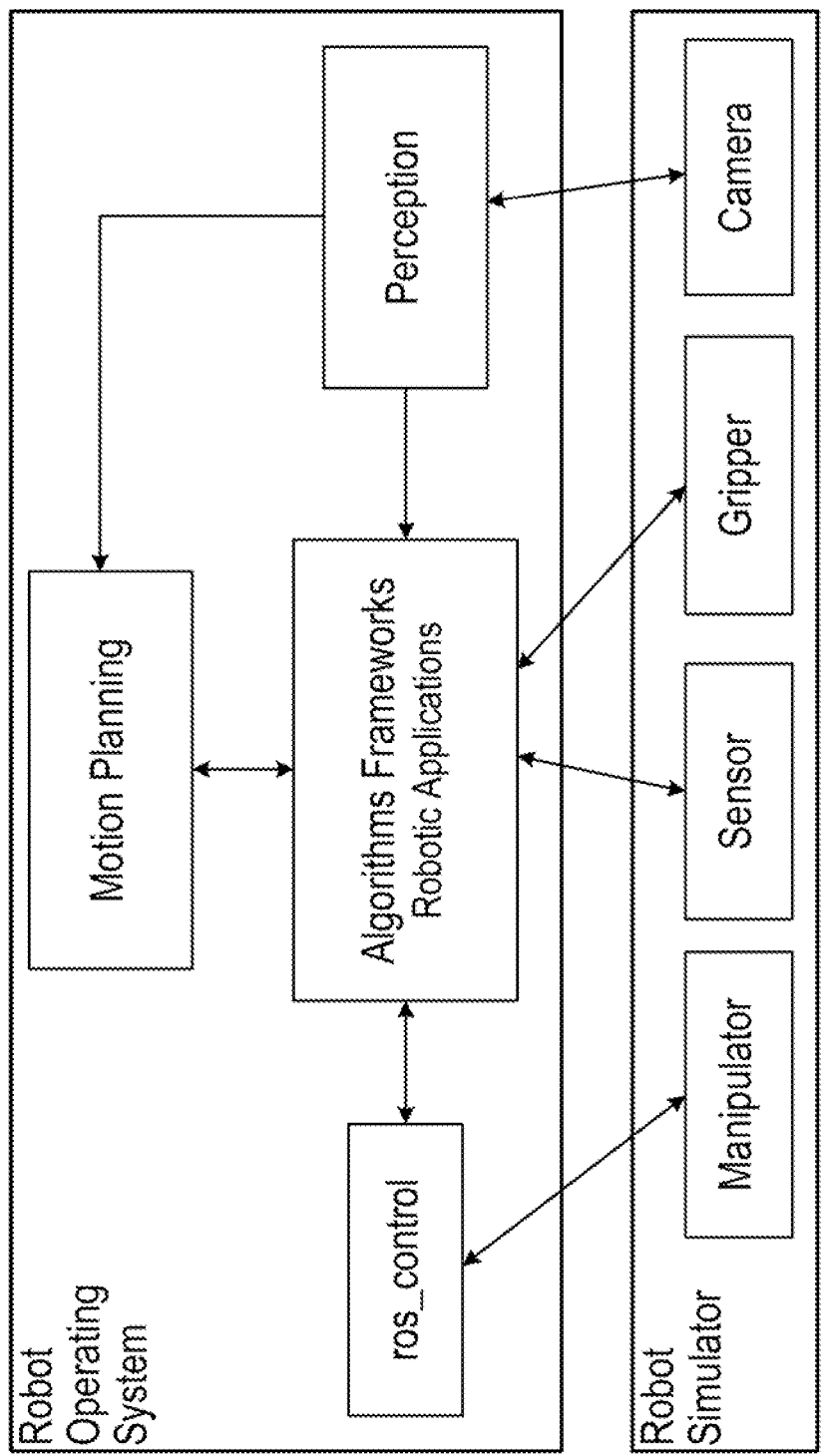
FIG. 2 illustrates the related art pipeline to make a robot move with robot simulation.

Processor(s) 910 can be configured to, responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation as illustrated in FIG. 2, FIG. 3 3, and FIG. 7.

Processor(s) 910 can be configured to, responsive to a commit command to commit a new robot simulation version associated with a corresponding one of the code versions, model versions and data versions, commit the new robot simulation to cloud storage and broadcast the new robot simulation version to one or more client devices via a differencing algorithm between the new robot simulation version and a prior robot simulation version as illustrated in FIGS. 6-8.

In example implementations, there can also be a block storage system, a file storage system, and a cloud storage system, wherein the block storage system is configured to store robot simulations corresponding to the robot simulation versions in redundant blocks, the file storage system storing files associated with a metadata database configured to manage metadata for the robot simulation versions, the data versions, the code versions, and the model versions, and the cloud storage system configured to facilitate storage for the block storage system, the file storage system, and the plurality of data repositories as illustrated in FIG. 2, FIG. 5, and FIG. 8.

Depending on the desired implementation, the redundant blocks and the data sets are stored as compressed data; and wherein the robot models are stored as files in the file storage system.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system, comprising:
 a plurality of data repositories, the plurality of data repositories comprising:
  a data repository configured to manage data versions of data sets corresponding to robot simulation versions;
  a code repository configured to manage code versions of executable code corresponding to the robot simulation versions; and
  a robot model repository configured to manage model versions of robot models corresponding to the robot simulation versions;
 a management server, comprising:
  a processor, configured to:
   responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation; and
 a block storage system, a file storage system, and a cloud storage system, wherein:
  the block storage system is configured to store robot simulations corresponding to the robot simulation versions in redundant blocks,
  the file storage system storing files associated with a metadata database configured to manage metadata for the robot simulation versions, the data versions, the code versions, and the model versions, and
  the cloud storage system configured to facilitate storage for the block storage system, the file storage system, and the plurality of data repositories.

2. The system of claim 1, the processor configured to:
 responsive to a commit command to commit a new robot simulation version associated with a corresponding one of the code versions, model versions and data versions, commit the new robot simulation to cloud storage and broadcast the new robot simulation version to one or more client devices via a differencing algorithm between the new robot simulation version and a prior robot simulation version.

3. The system of claim 1, wherein the redundant blocks and the data sets are stored as compressed data;
 wherein the robot models are stored as files in the file storage system.

4. A management server communicatively coupled to a plurality of data repositories, the plurality of data repositories comprising a data repository configured to manage data versions of data sets corresponding to robot simulation versions; a code repository configured to manage code versions of executable code corresponding to the robot simulation versions; and a robot model repository configured to manage model versions of robot models corresponding to the robot simulation versions; the management server comprising:
 a processor, configured to:
  responsive to a request of execution of a robot simulation, fetch, from the plurality of data repositories, corresponding one or more of the data sets having a data version from the data versions that corresponds to a robot simulation version of the robot simulation from the robot simulation versions, corresponding executable code having a code version from the data versions that corresponds to the robot simulation version of the robot simulation, and a corresponding robot model having a model version from the model versions that corresponds to the robot simulation version of the robot simulation, wherein the management server is communicatively coupled to a block storage system, a file storage system, and a cloud storage system, wherein the block storage system configured to store robot simulations corresponding to the robot simulation versions in redundant blocks, wherein the file storage system storing files associated with a metadata database configured to manage metadata for the robot simulation versions, the data versions, the code versions, and the model versions, and wherein the cloud storage system configured to facilitate storage for the block storage system, the file storage system, and the plurality of data repositories.

5. The management server of claim 4, wherein the processor is configured to:

responsive to a commit command to commit a new robot simulation version associated with a corresponding one of the code versions, model versions and data versions, commit the new robot simulation to cloud storage and broadcast the new robot simulation version to one or more client devices via a differencing algorithm between the new robot simulation version and a prior robot simulation version.

6. The management server of claim 4, wherein the redundant blocks and the data sets are stored as compressed data;

wherein the robot models are stored as files in the file storage system.

* * * * *